United States Patent [19]
Brooks

[11] 3,948,789

[45] Apr. 6, 1976

[54] ELECTRICAL DEVICES CONTAINING IMPROVED DIELECTRIC FLUIDS

[75] Inventor: William T. Brooks, Midland, Mich.

[73] Assignee: Dow Corning Corporation, Midland, Mich.

[22] Filed: Mar. 3, 1975

[21] Appl. No.: 554,893

[52] U.S. Cl. .................... 252/65; 252/66; 317/259; 174/127; 336/94; 252/78; 252/79 R

[51] Int. Cl.[2] ........................ H01B 3/18; H01G 4/02

[58] Field of Search .......... 252/63.7, 64, 66, 65, 78, 252/79; 260/468 G; 317/258, 259; 174/127; 336/94

[56] References Cited

OTHER PUBLICATIONS

Chemical Abstracts Vol. 64, Col. 11011–11012a (1966).

*Primary Examiner*—John D. Welsh

*Attorney, Agent, or Firm*—Jack E. Moermond

[57] ABSTRACT

Improved electrical devices such as transformers, and capacitors containing an improved dielectric fluid consisting essentially of a major amount of a liquid polyorganosiloxane and a minor amount of certain selected chlorendates which are soluble in said siloxane are disclosed.

10 Claims, No Drawings

ELECTRICAL DEVICES CONTAINING IMPROVED DIELECTRIC FLUIDS

In numerous electrical devices it is necessary to provide a liquid insulating medium which is called a "dielectrical fluid." This liquid has a substantial higher breakdown strength than air and by displacing air from spaces between conductors in the electrical equipment or apparatus, materially raises the breakdown voltage of the electrical device. With the ever increasing sophistication of electrical equipment, the various electrical devices are operating at higher and higher voltages. This means that the dielectric fluids used in such devices are subjected to greater and greater stresses. These problems have, of course, necessitated the search for improved dielectric fluids.

Polychlorinated biphenyl compounds (generally known as "PCB's") have been a standard dielectric fluid in electrical devices since the 1930's when the PCB's replaced mineral oil in certain applications. Various other liquids including some siloxanes have also been suggested for use as dielectric fluids. See for example U.S. Pat. Nos. 2,377,689 and 3,838,056 and British Pat. Nos. 899,658 and 899,661. Recently the PCB's have lost favor in the sight of environmentalists and, be they right or wrong, efforts are being made worldwide to find suitable replacements for the PCB's.

By way of illustration corona or partial discharge is a major factor causing deterioration and failure of capacitors or other electrical devices. A capacitor operating in corona will have a life of only minutes or hours instead of the expected years. A capacitor properly impregnated with a suitable dielectric fluid will be essentially free of corona discharge to a voltage of at least twice the rated voltage. During use when a dielectric fluid is placed under increasing stress a point is reached where partial breakdown occurs. The voltage at which the capacitor will suddenly flash into partial discharge or corona is known in the art as the corona inception voltage (CIV). The corona will extinguish with a reduction of voltage. The corona extinction voltage (CEV) is not a fixed value for each fluid but is a function of the intensity of corona before the voltage is reduced. For best results both the CIV and CEV should be as high and as close together as possible.

It has been discovered in accordance with this invention that when certain select chlorendates are incorporated into liquid polyorganosiloxanes that the resulting composition is useful as a dielectric fluid in electrical devices. It is further believed that these compositions when used as dielectric fluids provide suitable replacements for the PCB's which are currently being employed in the marketplace.

More specifically, this invention relates to an electrical device containing a dielectric fluid wherein the improvement comprises employing as the dielectric fluid a composition consisting essentially of a major amount of a liquid polyorganosiloxane and a minor amount of a compound soluble in said siloxane which compound has the general formula

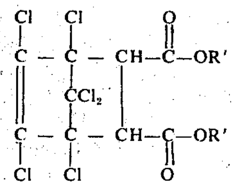

wherein each R' is a hydrogen atom or an alkyl radical containing from 1 to 12 carbon atoms.

This invention further relates to a dielectric fluid consisting essentially of a major amount of a liquid polyorganosiloxane and a minor amount of a compound soluble in said siloxane which compound has the general formula

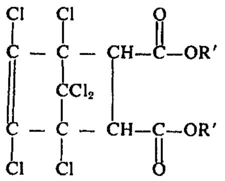

wherein each R' is a hydrogen atom or an alkyl radical containing from 1 to 12 carbon atoms.

The liquid polyorganosiloxanes useful in this invention will be composed predominately of siloxane units of the formula $R_2SiO$ and may also contain small amounts of siloxane units of the formulae $R_3SiO_{1/2}$, $RSiO_{3/2}$, and $SiO_{4/2}$. Of particular interest are liquid polyorganosiloxanes of the general formula $R_3SiO(R_2SiO)_xSiR_3$. In the foregoing formulae the R radicals preferably represent hydrocarbon radicals and halogenated hydrocarbon radicals. Illustrative examples of suitable R radicals are the methyl, ethyl, propyl, butyl, hexyl, decyl, dodecyl, octadecyl, vinyl, allyl, cyclohexyl, phenyl, xenyl, tolyl, xylyl, benzyl, 2-phenylethyl, 3-chloropropyl, 4-bromobutyl, 3,3,3-trifluoropropyl, dichlorophenyl, and alpha,alpha, alpha-trifluorotolyl radicals. Preferably R contains from 1 to 6 carbon atoms with the methyl, vinyl and phenyl radicals being the most preferred.

The liquid polyorganosiloxane portion of the dielectric fluid composition of this invention constitutes a major portion thereof, that is to say, more than 50 percent of the composition and preferably the liquid polyorganosiloxane constitutes from 80 to 99.5 percent by weight of the dielectric fluid composition of this invention. These liquid polyorganosiloxanes are well known materials which are commercially available throughout the world.

The dielectric fluid composition of this invention also contains a minor amount of a compound having the general formula

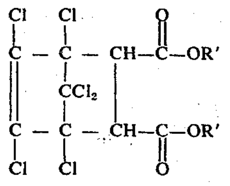

wherein each R' is a hydrogen atom or an alkyl radical containing from 1 to 12 carbon atoms. It is believed essential that these compounds be soluble in the liquid polyorganosiloxane portion of the composition. As indicated above, R' can be a hydrogen atom or an alkyl radical containing from 1 to 12 carbon atoms. Specific illustrative examples of R' include the methyl, ethyl, propyl, butyl, hexyl, 2-ethylhexyl, decyl and dodecyl radicals. While any of the above indicated compounds are useful in accordance with the present invention the chlorendate esters wherein the alkyl radical (R′) contains 4 to 8 carbon atoms are the preferred embodiment at this time. The acid and ester compounds used herein constitute a minor portion, that is, less than 50 percent of the composition of this invention. It is generally preferred, however, that these materials be employed in an amount in the range of from 0.5 to 20 percent by weight of the composition.

The dielectric fluid compositions of this invention may also contain small amounts of conventional additives such as HCl scavengers, corrosion inhibitors and other conventional additives normally employed is such compositions so long as they do not have an adverse effect of the performance of the compositions of this invention.

The two most important electrical devices in which the dielectric fluids of this invention are useful are in capacitors and transformers. They are also very useful dielectric fluids in other electrical devices such as electrical cables, rectifiers, eletomagnets, switches, fuses, circuit breakers and as coolants and insulators for dielectric devices such as transmitters, receivers, fly-back coils, sonar bouys, toys and military "black boxes." The methods for employing the dielectric fluids in these various applications (be they, for example, as a reservoir of liquid or as an impregnant) are well known to those skilled in the art. For best results, the viscosity of the dielectric fluid composition of this invention should be in the range of 5 to 500 centistokes at 25°C. If the viscosity exceeds 500 centistokes they are difficult to use as impregnants and at less than 5 centistokes their volatility becomes a problem unless they are used in a closed system.

Now in order that those skilled in the art may better understand how the present invention can be practiced the following examples are given by way of illustration and not by way of limitation. All parts and percents referred to herein are by weight and all viscosities measured at 25°C. unless otherwise specified.

EXAMPLE 1

A screening test for dielectric fluids was developed which it is believed correlates well with results obtained in test capacitors. The main piece of equipment required for this test is a Biddle Corona Detector with a manual Variac control. The test cell consists of a glass cylindrical container. The base of the cell is a ceramic filled plastic which has a stainless steel metal plate which is connected directly to ground. There is a stainless steel top for the container which has attached thereto a micrometer adjustable high voltage electrode with a steel phonograph needle on the end. The tip of this needle is positioned 0.025 inches (25 mils) above the grounded base. In the high voltage line attached to the electrode there is a $1.67 \times 10^8$ ohm resistance. This is a current limiting resistor.

During the test a few cubic centimeters of the test fluid is placed in the container and the top set in place. As the voltage is increased, partial discharge occurs between the tip of the electrode and the ground plate. This draws current which reduces the applied voltage below the discharge level. When no current is being drawn the applied voltage is again at partial discharge potential. Current is drawn by discharges again and the process is repeated. Thus the current is in effect turned on and off very rapidly, and the total breakdown of the fluid can never occur.

In operation the applied voltage is slowly increased by adjustment of the Variac. The partial discharges are observed on the oscilloscope of the corona detector. The point at which the eliptical lissajous pattern on the screen becomes flooded with discharges, and there is a constant audible crackling from the cell, is recorded as the corona inception voltage (CIV). The rate of rise of the applied voltage is perhaps a few hundred volts per second. When the CIV has been determined, the voltage is slowly decreased until the eliptical lissajous pattern on the screen can be seen again due to the partial cessation of discharges. The point at which this occurs is recorded as the corona extinction voltage (CEV).

A number of dielectric fluid compositions were prepared which consisted essentially of a liquid trimethylsilyl endblocked polydimethylsiloxane having a viscosity of 50 cs. and dibutylchlorendate in varying amounts. These compositions were tested in the screening test described above. The specific amount of dibutylchlorendate used (the balance being the siloxane) and the test results are set forth in the table below.

| | Ester Compound | Amount (Wgt %) | CIV (in KV) | CEV (in KV) |
|---|---|---|---|---|
| A* | None | None | 15.6 | 14.8 |
| B | Dibutylchlorendate | 10 | 21.0 | 20.0 |
| | 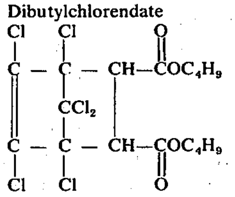 | 5 | 20.0 | 18.8 |
| | | 2.5 | 21.0 | 19.6 |
| | | 1 | 20.0 | 19.0 |

*Included for comparison

EXAMPLE 2

In this experiment small 0.01uf test capacitors of composite film/paper construction (2 0.0005 inch polypropylene films and a 0.0004 inch paper wick to provide a 0.0014 inch total barrier thickness) were impregnated in 1 ounce round vials with various dielectric fluid compoisitions. A small glass funnel was placed in the vial and the vial was centered in a 2 liter resin kettle by a fabricated wire bracket. The test dielectric fluid composition was contained in a 125 mil pressure equalizing dropping funnel over the center of the capacitor vial. The temperature within the kettle was raised to and maintained between 85° and 90°C. with a temperature controlled external heating mantle.

Vacuum on the above system was obtained with a mechanical forepump and a mercury vapor diffusion pump. Pressure would quickly drop to about 150 microns Hg and would continue to drop slowly for about 24 hours. Final pressure would be below 10 microns Hg. (Note: Pressure must be measured in the kettle and not at the pump inlet. Differences of over 100 microns Hg pressure were frequently observed.) Vacuum was maintained for 4 days prior to dropping the test dielectric fluid into the capacitor. If a volatile fluid was being tested, or a volatile component was present in the test fluid composition, the capacitor was allowed to cool prior to dropping the fluid. After the fluid was dropped vacuum was maintained for at least 30 minutes.

The corona inception voltage of a capacitor tested immediately after removal from the vacuum chamber is usually very low. This indicates a lack of complete permeation of films and possibly some remaining dry spots in the capacitor. Permeation will continue after the above impregnation procedure is completed. With the compositions of this invention heating of the impregnated capacitor for several hours at 85°C. is necessary to achieve good permeation and satisfactory CIV values. The time for complete permeation at room temperature with the compositions of this invention has not been determined, however some literature references mention periods of about 3 months at room temperature for the currently used PCB's.

The dielectric fluid compositions used to impregnate the capacitors and the test results are set forth in the table below. The CIV reported was obtained by raising the voltage steadily at about 200 to 300 volts per second until corona was detected. The voltage was then reduced to an arbitrary value and, if the corona extinguished, the capacitor was rested for at least 5 minutes. After resting the capacitor was retested selecting a higher voltage to test for extinction. On occasions when duplicate capacitors have been prepared, the results were reproducible.

| Dielectric Fluid Composition | CIV (volts) | CEV (volts) |
|---|---|---|
| A* Aroclor 1016 - a commercial PCB | 2300 | 1700 |
| B* Trimethylsilyl endblocked polydimethylsiloxane fluid--50cs. | 2600 | 600 |
| C* Liquid siloxane composed of about 84 mol % dimethylsiloxane units, about 10 mol % phenylmethylsiloxane units and about 6 mol % trimethylsiloxane units--50 cs. | 2400 | 400 |
| D* $(C_6H_5)_2(CH_3)SiO[(CH_3)_2SiO]_{39}Si(CH_3)(C_6H_5)_2$ cs. | 2600 | 2400 |
| E 95% B plus 5% Dibutylchlorendate | 2600 | 1400 |

*Included for comparison.

EXAMPLE 3

When the compounds set forth below are substituted for the dibutylchlorendate used in Examples 1 or 2 above in amounts ranging from 0.5 to 20 percent by weight, similar results are obtained.

A. Chlorendic acid
B. Dimethylchlorendate
C. Dihexylchlorendate
D. Di(2-ethylhexyl)chlorendate
E. Didodecylchlorendate That which is claimed is:

1. A dielectric fluid consisting essentially of a major amount of a liquid polyorgansiloxane and a minor amount of a compound soluble in said siloxane, which compound has the general formula

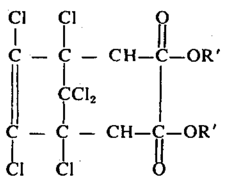

wherein each R' is a hydrogen atom or an alkyl radical containing from 1 to 12 carbon atoms.

2. A dielectric fluid as defined in claim 1 consisting essentially of about 80 to 99.5 percent by weight of the siloxane and about 0.5 to 20 percent by weight of the compound.

3. A dielectric fluid as defined in claim 2 wherein the siloxane has the general formula $R_3SiO(R_2SiO)_xSiR_3$ wherein R is a hydrocarbon or a halogenated hydrocarbon radical and $x$ is an integer, and the compound has the general formula

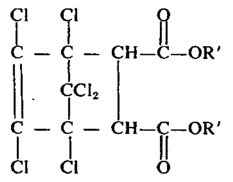

wherein R' is an alkyl radical containing from 4 to 8 carbon atoms.

4. A dielectric fluid as defined in claim 3 wherein R is a methyl radical and R' is a butyl radical.

5. A dielectric fluid as defined in claim 3 wherein R is a methyl radical and R' is a 2-ethylhexyl radical.

6. In an electrical device containing a dielectric fluid, the improvement comprising employing as the dielectric fluid a composition consisting essentially of a major amount of a liquid polyorganosiloxane and a minor amount of a compound soluble in said siloxane, which compound has the general formula

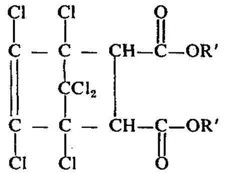

wherein each R' is a hydrogen atom or an alkyl radical containing from 1 to 12 carbon atoms.

7. An electrical device as defined in claim 6 wherein the composition employed consists essentially of about 80 to 99.5 percent by weight of the siloxane and about 0.5 to 20 percent by weight of the compound.

8. An electrical device as defined in claim 7 wherein the siloxane is a trimethylsilyl endblocked polydimethylsiloxane and the dielectric fluid composition has a viscosity in the range of 5 to 500 cs. at 25°C.

9. An electrical device as defined in claim 8 which is a transformer.

10. An electrical device as defined in claim 8 which is a capacitor.

* * * * *

UNITED STATES PATENT AND TRADEMARK OFFICE

CERTIFICATE OF CORRECTION

PATENT NO. : 3,948,789

DATED : April 6, 1976

INVENTOR(S) : William T. Brooks

It is certified that error appears in the above-identified patent and that said Letters Patent are hereby corrected as shown below:

Column 5, lines 56-64, the formula

"

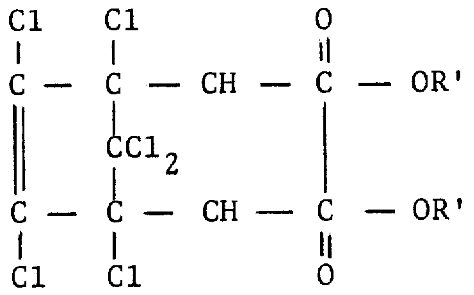

"

should read

--

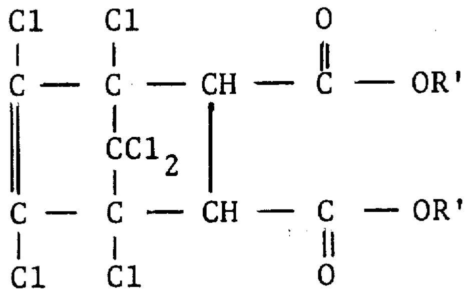

--

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*

Disclaimer 3,948,789.—*William T. Brooks*, Midland, Mich. ELECTRICAL DEVICES CONTAINING IMPROVED DIELECTRIC FLUIDS. Patent dated Apr. 6, 1976. Disclaimer filed Aug. 29, 1977, by the assignee, *Dow Corning Corporation.*

Hereby enters this disclaimer to claims 1 through 5, inclusive, of said patent.

[*Official Gazette October 18, 1977.*]